(12) United States Patent
Hartung et al.

(10) Patent No.: US 8,152,983 B2
(45) Date of Patent: Apr. 10, 2012

(54) ELECTROPHORETIC PAINT CONTAINING BISMUTH COMPONENTS

(75) Inventors: Michael Hartung, Geseke (DE); Ulrich Heimann, Münster (DE); Karl-Heinz Große-Brinkhaus, Nottuln (DE); Hardy Reuter, Münster (DE)

(73) Assignee: BASF Coatings GmbH, Munster (DE)

( * ) Notice: Subject to any disclaimer, the term of this patent is extended or adjusted under 35 U.S.C. 154(b) by 415 days.

(21) Appl. No.: 12/407,327

(22) Filed: Mar. 19, 2009

(65) Prior Publication Data
US 2009/0258981 A1    Oct. 15, 2009

Related U.S. Application Data

(63) Continuation of application No. 10/518,098, filed as application No. PCT/EP03/07378 on Jul. 9, 2003, now abandoned.

(30) Foreign Application Priority Data

Aug. 8, 2002   (DE) .................................. 102 36 350

(51) Int. Cl.
   *C25D 13/10* (2006.01)
(52) U.S. Cl. .......................... 204/488; 523/122; 524/177
(58) Field of Classification Search .................. 204/488; 523/122; 524/177
   See application file for complete search history.

(56) References Cited

U.S. PATENT DOCUMENTS

| | | | |
|---|---|---|---|
| 3,922,253 A | 11/1975 | Jerabek et al. | |
| 4,596,842 A * | 6/1986 | Chung et al. | 523/414 |
| 5,554,700 A | 9/1996 | Schipfer | |
| 5,702,581 A | 12/1997 | Kerlin et al. | |
| 5,965,000 A | 10/1999 | Klein | |
| 6,730,203 B2 | 5/2004 | Ikenoue et al. | |

FOREIGN PATENT DOCUMENTS

| | | |
|---|---|---|
| DE | 2541234 A1 | 4/1976 |
| DE | 2824418 A1 | 12/1978 |
| DE | 3300570 A1 | 7/1984 |
| DE | 3518732 A1 | 11/1986 |
| DE | 3738220 A1 | 5/1989 |
| DE | 4126476 A1 | 2/1992 |
| DE | 4330002 C1 | 3/1995 |
| DE | 19618379 A1 | 11/1997 |
| DE | 10001222 A1 | 8/2001 |
| EP | 0082291 A1 | 6/1983 |
| EP | 0178531 A1 | 4/1986 |
| EP | 0227975 A1 | 7/1987 |
| EP | 0234395 A2 | 9/1987 |
| EP | 0245786 A2 | 11/1987 |
| EP | 0261385 A2 | 3/1988 |
| EP | 0310971 A2 | 4/1989 |
| EP | 0333327 A1 | 9/1989 |
| EP | 0414199 A2 | 2/1991 |
| EP | 0456270 A1 | 11/1991 |
| EP | 0476514 A1 | 3/1992 |
| EP | 0595186 A1 | 5/1994 |
| EP | 0739389 B1 | 8/1994 |
| EP | 0639660 A1 | 2/1995 |
| EP | 0690106 A1 | 1/1996 |
| EP | 0817684 B1 | 11/1999 |
| EP | 0642558 B2 | 10/2001 |
| WO | WO93/24578 A2 | 12/1993 |
| WO | WO98/33835 A1 | 8/1998 |

OTHER PUBLICATIONS

Bismuth salicylate MSDS from Gelest, Inc. (no date available).
International Search Report for PCT/EP03/07378 dated Nov. 27, 2003.
International Preliminary Report for PCT/EP2003/007378 dated Mar. 17, 2004.

* cited by examiner

*Primary Examiner* — Kishor Mayekar
(74) *Attorney, Agent, or Firm* — Cantor Colburn LLP

(57) ABSTRACT

Electrocoat materials comprising bismuth compounds, further comprising
(A) at least one self-crosslinking and/or externally crosslinking binder containing (potentially) cationic or anionic groups and reactive functional groups which
   (i) with themselves or with complementary reactive functional groups in the self-crosslinking binder, or
   (ii) in the case of the externally crosslinking binder, with complementary reactive functional groups present in crosslinking agents (B)
are able to undergo thermal crosslinking reactions,
(B) if desired, at least one crosslinking agent comprising the complementary reactive functional groups, and
(C) bismuth subsalicylate of empirical formula $C_7H_5O_4Bi$.

11 Claims, No Drawings

ELECTROPHORETIC PAINT CONTAINING BISMUTH COMPONENTS

This is a continuation of U.S. Ser. No. 10/518,098 filed on Dec. 14, 2004, now abandoned, the disclosure of which is incorporated herein by reference and which application is a National Phase Application of Patent Application PCT/EP2003/007378 filed on 9 Jul. 2003, which claims priority to DE10236350.1, filed 8 Aug. 2002.

The present invention relates to novel electrocoat (EC) materials comprising bismuth compounds. The present invention also relates to the preparation of novel EC materials comprising bismuth compounds. The present invention further relates to the use of the novel EC materials comprising bismuth compounds for producing electrocoats.

EC materials comprising bismuth compound catalysts are known. Features of the bismuth compounds include a lower toxicity as compared with the tin compounds, as well as a high activity.

For instance, DE 25 41 234 describes salts (carboxylates), among others, of bismuth as curing catalysts for electrocoat materials.

EP 0 509 437 discloses electrocoat materials which crosslink by way of blocked isocyanate groups and which comprise at least one dialkyl salt of aromatic carboxylic acids and at least one bismuth compound or zirconium compound.

In EP 0 642 558, however, the bismuth compounds possible for use in electrocoat materials are significantly restricted on account of the fact that the readily available salts of relatively long-chain acids, such as bismuth octanoate and bismuth neodecanoate, for example, give rise to defects as a result of oily exudations when used in cationic binders. Furthermore, inorganic bismuth compounds are said to be difficult to disperse by mixing them into the binder or into a pigment paste, and to be of only low catalytic activity in that form.

European patent application EP 0 690 106 A1 discloses compositions which comprise water-soluble bismuth compounds, which are suitable as catalysts for the curing of EC materials. They include an epoxy-amine adduct in an amount such that the ratio of the number of bismuth atoms to the number of beta-hydroxyamine groups in the epoxy-amine adduct is from 1:10 to 10:1. The acid used for preparing the bismuth compounds is employed in an amount such that there are between 0.1 and less than 2 mol of dissociable protons per mole of bismuth. The numerous acids which can be used include salicylic acid. Further details, however, are lacking; in the examples, only dimethylolpropionic acid is used.

European patent EP 0 739 389 describes a simplified process for preparing a corrosion protection coating by electrocoating, in which the electrocoat material comprises bismuth lactate or bismuth dimethylolpropionate. In the priority-substantiating document DE 43 30 002, further possible bismuth compounds, including bismuth salicylate, are mentioned, but the document lacks further details; in particular, only the salts of lactic acid and dimethylolpropionic acid are used in the examples. Bismuth subsalicylate is not mentioned.

DE 100 01 222 mentions the use of colloidal bismuth for improving the corrosion protection of electrocoat materials. Here again, bismuth salts of aliphatic carboxylic acids are employed.

It is an object of the present invention to find novel electrocoat materials (EC materials) which comprise bismuth compounds but which do not possess the prior art disadvantages described in EP 0 642 558 but instead allow the bismuth compounds to be incorporated simply and stably into the electrocoat material, where the electrocoat materials prepared from these compounds exhibit good leveling, are free from surface defects, and afford good corrosion protection.

The invention accordingly provides the novel electrocoat (EC) materials comprising bismuth compounds and further comprising
(A) at least one self-crosslinking and/or externally crosslinking binder containing (potentially) cationic or anionic groups and reactive functional groups which
   (i) with themselves or with complementary reactive functional groups in the self-crosslinking binder, or
   (ii) in the case of the externally crosslinking binder, with complementary reactive functional groups present in crosslinking agents (B)
are able to undergo thermal crosslinking reactions,
(B) if desired, at least one crosslinking agent comprising the complementary reactive functional groups, and
(C) water-insoluble pulverulent bismuth Subsalicylate of empirical formula $C_7H_5O_4Bi$. In the light of the prior art it was surprising and unforeseeable for the skilled worker that the object on which the invention was based could be achieved by the electrocoat materials of the invention.

A particular surprise was that the EC materials of the invention were easy to prepare, were stable on storage, featured an optimum particle size of the dispersed constituents, and possessed very good filterability. Their electrophoretic deposition on electrically conductive substrates was easy and trouble-free. The resultant electrocoats were very even, were free from surface defects and inhomogeneities, and afforded outstanding corrosion protection and edge protection. In one particular application, the deposited but uncured or only part-cured films of the EC materials of the invention can be overcoated wet on wet with aqueous coating materials, such as waterborne primers or waterborne surfacers, without defects and then baked together with said aqueous coating materials.

The EC materials of the invention preferably have a solids content of from 5 to 50% by weight, more preferably from 5 to 35% by weight. Solids here are the fraction of an EC material which makes up the electrocoat produced from it.

The EC materials of the invention comprise at least one binder (A).

The binders (A) may be self-crosslinking and/or externally crosslinking.

Self-crosslinking binders (A) contain reactive functional groups which are able to undergo thermal crosslinking reactions with themselves and/or with complementary reactive functional groups in the self-crosslinking binders (A).

Externally crosslinking binders (A) contain reactive functional groups which are able to undergo thermal crosslinking reactions with complementary reactive functional groups in crosslinking agents (B).

It is preferred to use at least one externally crosslinking binder (A) in combination with at least one crosslinking agent (B).

The binder (A) contains potentially cationic and/or cationic groups. Binders (A) of this kind are used in cathodically depositable electrocoat materials.

Examples of suitable potentially cationic groups which can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups are primary, secondary, tertiary or quaternary ammonium groups, tertiary sulfonium groups or quaternary phosphonium groups, preferably quaternary ammonium groups or tertiary sulfonium groups, but especially quaternary ammonium groups.

Examples of suitable neutralizing agents for the potentially cationic groups are inorganic and organic acids such as sulfuric acid, hydrochloric acid, phosphoric acid, formic acid, acetic acid, lactic acid, dimethylolpropionic acid or citric acid, especially formic acid, acetic acid or lactic acid.

Examples of suitable binders (A) for cathodically depositable electrocoat materials are known from documents EP 0 082 291 A1, EP 0 234 395 A1, EP 0 227 975 A1, EP 0 178 531 A1, EP 0 333 327, EP 0 310 971 A1, EP 0 456 270 A1, U.S. Pat. No. 3,922,253 A, EP 0 261 385 A1, EP 0 245 786 A1, EP 0 414 199 A1, EP 0 476 514 A1, EP 0 817 684 A1, EP 0 639 660 A1, EP 0 595 186 A1, DE 41 26 476 A1, WO 98/33835, DE 33 00 570 A1, DE 37 38 220 A1, DE 35 18 732 A1 or DE 196 18 379 A1. These are preferably resins (A) containing primary, secondary, tertiary or quaternary amino or ammonium groups and/or tertiary sulfonium groups and having amine numbers of preferably between 20 and 250 mg KOH/g and a weight-average molecular weight of from 300 to 10 000 daltons. In particular, use is made of amino (meth)acrylate resins, amino epoxy resins, amino epoxy resins with terminal double bonds, amino epoxy resins with primary and/or secondary hydroxyl groups, amino polyurethane resins, amino-containing polybutadiene resins or modified epoxy resin-carbon dioxide-amine reaction products.

Alternatively, the binder (A) may comprise anionic and/or potentially anionic groups. Binders (A) of this kind are used in anionically depositable electrocoat materials.

Examples of suitable potentially anionic groups which can be converted into anions by neutralizing agents are carboxylic, sulfonic or phosphonic acid groups, especially carboxylic acid groups.

Examples of suitable anionic groups are carboxylate, sulfonate or phosphonate groups, especially carboxylate groups.

Examples of suitable neutralizing agents for the potentially nonionic groups are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine, and the like.

Examples of suitable binders (A) for anionically depositable electrocoat materials are known from German patent application DE 28 24 418 A1. They are preferably polyesters, epoxy resin esters, poly(meth)acrylates, maleate oils or polybutadiene oils having a weight-average molecular weight of from 300 to 10 000 daltons and an acid number of from 35 to 300 mg KOH/g.

The amount of neutralizing agent is generally chosen such that from 1 to 100 equivalents, preferably from 50 to 90 equivalents, of the potentially cationic or potentially anionic groups of a binder (A) are neutralized.

Examples of suitable reactive functional groups are hydroxyl groups, thiol groups, and primary and secondary amino groups, especially hydroxyl groups.

Examples of suitable complementary reactive functional groups are blocked isocyanate groups, hydroxymethylene and alkoxymethylene groups, preferably methoxymethylene and butoxymethylene groups, and especially methoxymethylene groups. Preference is given to using blocked isocyanate groups. Examples of suitable blocking agents are those described below.

The EC materials used are preferably cathodic.

The amount of the above-described binders (A) in the EC materials of the invention is guided inparticular by their solubility and their dispersibility in the aqueous medium and by their functionality with regard to the crosslinking reactions with themselves or with the constituents (B), and may therefore be determined readily be the skilled worker on the basis of his or her general art knowledge, where appropriate with the assistance of simple preliminary tests.

Suitable crosslinking agents (B) include all customary and known crosslinking agents which contain suitable complementary reactive functional groups. The crosslinking agents (B) are preferably selected from the group consisting of blocked polyisocyanates, melamine-formaldehyde resins, tris(alkoxycarbonylamino)triazines, and polyepoxides. The crosslinking agents (B) are more preferably selected from the group consisting of blocked polyisocyanates and highly reactive melamine-formaldehyde resins. With particular preference the blocked polyisocyanates are used.

The blocked polyisocyanates (B) are prepared from customary and known paint polyisocyanates containing aliphatically, cycloaliphatically, araliphatically and/or aromatically attached isocyanate groups.

Preference is given to using paint polyisocyanates having from 2 to 5 isocyanate groups per molecule and having viscosities of from 100 to 10 000, preferably from 100 to 5000, and in particular from 100 to 2000 mPas (at 23° C.). Moreover, the paint polyisocyanates may have been given a conventional hydrophilic or hydrophobic modification.

Examples of suitable paint polyisocyanates are described, for example, in "Methoden der organischen Chemie", Houben-Weyl, Volume 14/2, $4^{th}$ edition, Georg Thieme Verlag, Stuttgart 1963, pages 61 to 70, and by W. Siefken, Liebigs Annalen der Chemie, Volume 562, pages 75 to 136.

Further examples of suitable paint polyisocyanates are polyisocyanates containing isocyanurate, biuret, allophanate, iminooxadiazinedione, urethane, urea, carbodiimide and/or uretdione groups, which are obtainable from customary and known diisocyanates. As diisocyanates it is preferred to use hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate or 1,3-bis(isocyanatomethyl)cyclohexane (BIC), diisocyanates derived from dimer fatty acids, 1,8-diisocyanato-4-isocyanatomethyloctane, 1,7-diisocyanato-4-isocyanatomethylheptane, 1-isocyanato-2-(3-isocyanatopropyl)cyclohexane, 2,4- and/or 2,6-tolylene diisocyanate, 4,4'-diphenylmethane diisocyanate, naphthalene diisocyanate or mixtures of these polyisocyanates.

Examples of suitable blocking agents for preparing the blocked polyisocyanates (B) are
i) phenols, such as phenol, cresol, xylenol, nitrophenol, chlorophenol, ethylphenol, t-butylphenol, hydroxybenzoic acid, esters of this acid or 2,5-di-tert-butyl-4-hydroxytoluene;
ii) lactams, such as ε-caprolactam, δ-valerolactam, γ-butyrolactam or β-propiolactam;
iii) active methylenic compounds, such as diethyl malonate, dimethyl malonate, methyl or ethyl acetoacetate or acetylacetone;
iv) alcohols such as methanol, ethanol, n-propanol, isopropanol, n-butanol, isobutanol, t-butanol, and n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolates, lactic acid, lactates, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;
vi) acid amides such as acetoanilide, acetoanisidinamide, acrylamide, methacrylamide, acetamide, stearamide or benzamide;
vii) imides such as succinimide, phthalimide or maleimide;
viii) amines such as diphenylamine, phenylnaphthylamine, xylidine, N-phenylxylidine, carbazole, aniline, naphthylamine, butylamine, dibutylamine or butylphenylamine;
ix) imidazoles such as imidazole or 2-ethylimidazole;
x) ureas such as urea, thiourea, ethyleneurea, ethylenethiourea or 1,3-diphenylurea;
xi) carbamates such as phenyl N-phenylcarbamate or 2-oxazolidone;
xii) imines such as ethyleneimine;
xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;
xiv) salts of sulfurous acid such as sodium bisulfite or potassium bisulfite;
xv) hydroxamic esters such as benzyl methacrylohydroxamate (BMH) or allyl methacrylohydroxamate; or
xvi) substituted pyrazoles, imidazoles or triazoles; and also
xvii) mixtures of these blocking agents.

The amount of the above-described crosslinking agents (B) In the EC materials of the invention is guided in particular by their functionality with regard to the crosslinking reaction with the constituents (A) and may therefore readily be determined by the skilled worker on the basis of his or her general art knowledge, where appropriate with the assistance of simple preliminary tests.

In accordance with the invention the EC materials of the invention comprise a water-insoluble pulverulent bismuth subsalicylate (C) of empirical formula $C_7H_5O_4Bi$. It has a bismuth content according to DAB [German Pharmacopeia] 7 of from 56.5 to 60% by weight. Bismuth subsalicylate (C) is a commercial compound and is sold, for example, by MCP HEK GmbH, Lubeck, Germany. Based on their solids, the EC materials of the invention contain preferably from 0.05 to 5%, more preferably from 0.1 to 4%, and in particular from 0.2 to 3% by weight of bismuth subsalicylate (C).

Additionally, the EC materials of the invention may further comprise at least one customary and known additive (D) selected from the group consisting of catalysts other than bismuth Subsalicylate (C); pigments; anticrater additives; polyvinyl alcohols; thermally curable reactive diluents; molecularly dispersely soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermolabile free-radical initiators; adhesion promoters; leveling agents; film-forming auxiliaries; flame retardants; corrosion inhibitors; flow aids; waxes; siccatives; biocides, and flatting agents, in effective amounts.

Further examples of suitable additives (D) are described in the textbook "Lackadditive" [Additives for coatings] by Johan Bieleman, Wiley-VCH, Weinheim, New York, 1998, in D. Stoye and W. Freitag (editors), "Paints, Coatings and Solvents", Second, Completely Revised Edition, Wiley-VCH, Weinheim, New York, 1998, "14.9. Solvent Groups", pages 327 to 373.

Pigments are preferably used as additives (D). The pigments (D) are preferably selected from the group consisting of customary and known color pigments, effect pigments, electrically conductive pigments, magnetically shielding pigments, fluorescent pigments, extender pigments, and anticorrosion pigments, organic and inorganic.

The EC materials of the invention are prepared by mixing and homogenizing the above-described constituents (A), (B), (C) and (D) if desired, using customary and known mixing techniques and apparatus such as stirred tanks, stirred mills, extruders, kneading apparatus, Ultraturrax, inline dissolvers, static mixers, micromixers, toothed-gear dispersers, pressure relief nozzles and/or microfluidizers. The pigments are incorporated preferably in the form of pigment pastes or pigment preparations into the EC materials (cf. Römpp Lexikon Lacke und Druckfarben, Georg Thieme Verlag, Stuttgart, New York, 1998, "Pigment preparations", page 452). A further particular advantage of the bismuth Subsalicylate (C) used in accordance with the invention is that it lends itself outstandingly to incorporation into the pigment pastes and into the EC materials of the invention.

The EC materials of the invention are applied conventionally by immersing an electrically conductive substrate in an electrocoating bath of the invention, connecting the substrate as the cathode or anode, preferably as the cathode, depositing an EC material film on the substrate using direct current, removing the coated substrate from the electrocoating bath, and subjecting the deposited EC material film to conventional thermal clearing (baking). The resulting electrocoat can then be overcoated with a surfacer or with an antistonechip primer and a solid-color topcoat material or, alternatively, with a basecoat material and a clearcoat material by the wet-on-wet technique. The surfacer film or antistonechip primer film and also the solid-color topcoat film are preferably each baked individually. The basecoat film and the clearcoat film are preferably baked together. This procedure results in multicoat paint systems having outstanding performance properties.

Alternatively, it is possible to produce the multicoat paint systems by wet-on-wet techniques wherein the deposited EC material film is not cured or is only partly cured thermally and is immediately overcoated with the other coating materials, especially aqueous coating materials, after which it is baked together with at least one of the films of the coating materials (EC material film+surfacer film; EC material film+surfacer film+solid-color topcoat film; EC material film+surfacer film+basecoat film, or EC material film+surfacer film+basecoat film+clearcoat film). Here again, the resulting multicoat paint systems have outstanding performance properties, the production processes being particularly economic and energy-saving. In the course of these processes it is found that the EC material films of the invention lend themselves particularly well to undisrupted overcoating by the wet-on-wet technique.

In all cases, electrocoats of the invention are obtained which exhibit very good leveling, are free from surface defects and inhomogeneities, and afford outstanding corrosion protection and edge protection.

EXAMPLES

Preparation Example 1

The Preparation of a Crosslinking Agent for a Cathodic EC Material

A reactor is charged under nitrogen with 10 462 parts of isomers and higher polyfunctional oligomers based on 4,4'-diphenylmethane diisocyanate, having an NCO equivalent weight of 135 g/eq (Lupranat® M20S from BASF AG; NCO functionality about 2.7; 2,2'- and 2,4'-diphenylmethanediisocyanate content less than 5%). 20 parts of dibutyltin dilaurate are added and 9626 parts of butyl diglycol are added dropwise at a rate such that the product temperature remains below 60° C. After the end of the addition, the temperature is held at 60° C. for 60 minutes more and an NCO equivalent weight of 1 120 g/eq is determined (based on solid fractions). Following dissolution in 7 737 parts of methyl isobutyl ketone and addition of 24 parts of dibutyltin dilaurate, 867 parts of melted trimethylolpropane are added at a rate such that the temperature of the product does not exceed 100° C. Following the end of the addition, stirring is continued for 60 minutes more. The mixture is cooled to 65° C. and diluted simultaneously with 963 parts of n-butanol and 300 parts of methyl isobutyl ketone. The solids content is 70.1% (1 h at 130° C.).

Preparation Example 2

The Preparation of a Precursor of the Amine Component for a Binder for a Cathodic EC Material The water of reaction is removed at from 110 to 140° C. from a 70% strength solution of diethylenetriamine in methyl isobutyl ketone. The product is subsequently diluted with methyl isobutyl ketone until the solution has an amine equivalent weight of 131 g/eq.

Preparation Example 3

The Preparation of an Aqueous Dispersion Comprising a Binder and the Crosslinking Agent from Preparation Example 1

In a reactor, 5 797 parts of epoxy resin based on bisphenol A, having an epoxy equivalent weight (EEW) of 188 g/eq, together with 1 320 parts of bisphenol A, 316 parts of dodecylphenol, 391 parts of p-cresol and 413 parts of xylene are heated to 125° C. under nitrogen and stirred for 10 minutes. The mixture is subsequently heated to 130° C. and 22 parts of N,N-dimethylbenzylamine are added. The reaction batch is held at this temperature until the EEW has reached a level of 814 g/eq.

Then 7 810 parts of the crosslinking agent from preparation example 1 are added and a temperature of 100° C. is maintained. Half an hour after adding the crosslinker, 198 parts of butyl glycol and 1 002 parts of sec-butanol are added. Immediately thereafter a mixture of 481 parts of the precursor from example 2 and 490 parts of methylethanolamine are added to the reactor and the batch is conditioned to 100° C. After another half an hour the temperature is raised to 105° C. and 150 parts of N,N-dimethylaminopropylamine are added.

Addition of the amine is followed 45 minutes later by addition of 879 parts of Plastilit® 3060 (propylene glycol compound from BASF) and 45 parts of a customary additive, then dilution is carried out with a mixture of 490 parts of propylene glycol phenyl ether and 196 parts of sec-butanol, and the mixture is cooled to 95° C.

After 10 minutes, 14 930 parts of the reaction mixture are transferred to the dispersing vessel. In that vessel, 455 parts of lactic acid (88% in water) in solution in 6 993 parts of water are added with stirring. This is followed by 20 minutes of homogenization before diluting further with an additional 12 600 parts of water.

Vacuum distillation removes the volatile solvents, which are then replaced in equal quantity by water.

The characteristics of the dispersion are as follows:

| | |
|---|---|
| Solids content: | 31.9% (1 hour at 130° C.) |
| Base content: | 0.69 meq/g solids |
| Acid content: | 0.32 meq/g solids |
| pH: | 6.2 |
| Particle size: | 113 nm |

Preparation Example 4

The Preparation of an Aqueous Solution of a Grinding Resin

Preparation Example 4.1

The Preparation of an Epoxy-Amine Adduct Solution

In accordance with international patent application WO 91/09917, example 1.3, grinding resin A3, an organic-aqueous solution of an epoxy-amine adduct is prepared by in a first stage reacting 2 598 parts of bisphenol A diglycidyl ether (epoxy equivalent weight (EEW): 188 g/eq), 787 parts of bisphenol A, 603 parts of dodecylphenol and 206 parts of butyl glycol in the presence of 4 parts of triphenylphosphine at 130° C. to an EEW of 865 g/eq. While the mixture cools, it is diluted with 849 parts of butyl glycol and 1 534 parts of D.E.R. 732 (polypropylene glycol diglycidyl ether from DOW Chemical) and is reacted further at 90° C. with 266 parts of 2,2'-aminoethoxyethanol and 212 parts of N,N-dimethylaminopropylamine. After 2 hours the viscosity of the resin solution is constant (5.3 dpas; 40% in Solvenon® PM (methoxypropanol from BASF AG); cohe and plate viscometer at 23° C.). The product is diluted with 1 512 parts of butyl glycol and the base groups are partly neutralized with 201 parts of glacial acetic acid, after which the product is diluted further with 1 228 parts of deionized water and discharged. This gives a 60% strength aqueous-organic resin solution whose 10% dilution has a pH of 6.0.

The epoxy-amine adduct solution is used below to prepare an aqueous solution and/or dispersion of a grinding resin.

Example 1

The Preparation of a Pigment Paste Comprising Bismuth Subsalicylate

First of all, 28 000 parts of water and 25 000 parts of the resin solution described in preparation example 4.1 are mixed. Then 500 parts of carbon black, 6 700 parts of extender ASP 200, 37 300 parts of titanium dioxide (TI-PURE® 900, DuPont) and 2 500 parts of bismuth subsalicylate are mixed and passed to a ZKW stirred mill. The mixture is dispersed in circulation mode until a Hegman fineness of 12 µm has been reached.

A stable pigment paste is obtained which does not undergo sedimentation even after storage for two months at 40° C.

Example 2

The Preparation of a Cathodic Electrocoat Material of the Invention and Production of an Inventive Electrocoat An electrocoating bath is prepared from 2 053 parts by weight of deionized water, 2 348 parts by weight of the dispersion from preparation example 3 and 599 parts by weight of the pigment paste from example 1. The resulting electrocoat material has a solids content of about 20% with an ash content of 25%. The particle size of the dispersed constituents is optimized to the intended use. The filterability of the electrocoat material is very good and it is highly resistant to infestation to microorganisms.

After deposition at 300-330 V and a bath temperature of 30° C. with baking (15 minutes; substrate temperature 175° C.), steel panels which have not been given a passivating rinse but have been phosphatized (BO 26 W 42 OC, Chemetall) carry smooth films having a thickness of 20-22 μm. No surface defects or inhomogeneities are observed. Corrosion protection and edge protection are outstanding [climatic cycling test: scribe creep (10 cycles): 1.2 mm; edge rusting rating: 1 to 2 (1=best rating, 5=worst rating)].

What is claimed is:

1. A method of making an electrocoat composition, which is 5 to 35% by weight solids, comprising combining:
   (A) at least one binder comprising at least one group that is a potentially cationic ammonium group and/or cationic ammonium group, and one or more reactive functional groups which with complementary reactive functional groups in a crosslinking agent (B) are able to undergo thermal crosslinking reactions,
   (B) at least one crosslinking agent comprising the complementary reactive functional groups,
   (C) from 0.2 to 5% by weight, based on solids in the composition, of a bismuth subsalicylate compound having an empirical formula of $C_7H_5O_4Bi$ that is water-insoluble and pulverulent, wherein the bismuth subsalicylate (C) has a bismuth content of from 56.5 to 60% by weight;
   (D) pigments selected from the group consisting of color pigments, effect pigments, electrically conductive pigments, magnetically shielding pigments, fluorescent pigments, extender pigments, anticorrosion pigments, organic pigments, inorganic pigments, and mixtures comprising at least one of the foregoing; and
   (E) a grinding resin;
   wherein the electrocoat composition is made by mixing and milling the grinding resin and the pigments, in combination with the bismuth subsalicylate, in a means for obtaining fineness of mixture to form a storage stable pigment paste, and then combining the pigment paste with a dispersion comprising the binder and crosslinking agent.

2. The method of claim 1 wherein the composition comprises bismuth salt consisting of the bismuth subsalicylate compound.

3. The method of claim 1 wherein the storage stable pigment paste does not undergo sedimentation after storage for two months at 40° C.

4. The method of claim 1 wherein the grinding resin is an epoxy-amine adduct.

5. The method of claim 1 wherein the at least one binder comprises one or more reactive functional groups which comprise hydroxyl groups.

6. The method of claim 1 wherein the crosslinking agent comprises a blocked polyisocyanate.

7. The method of claim 1 wherein the at least one binder (A) comprises at least one self-crosslinking binder.

8. A method of making an electrocoat composition, which is 5 to 35% by weight solids, comprising combining:
   (A) at least one binder comprising at least one group that is a potentially cationic ammonium group and/or cationic ammonium group, and one or more reactive functional groups which comprise hydroxyl groups and undergo thermal crosslinking reactions;
   (B) at least one crosslinking agent that comprises a blocked polyisocyanate,
   (C) from 0.2 to 5% by weight, based on solids in the composition, of a bismuth subsalicylate compound having an empirical formula of $C_7H_5O_4Bi$ that is water-insoluble and pulverulent, wherein the bismuth subsalicylate (C) has a bismuth content of from 56.5 to 60% by weight;
   (D) pigments selected from the group consisting of color pigments, effect pigments, electrically conductive pigments, magnetically shielding pigments, fluorescent pigments, extender pigments, anticorrosion pigments, organic pigments, inorganic pigments, and mixtures comprising at least one of the foregoing; and
   (E) a grinding resin that is an epoxy-amine adduct;
   wherein the electrocoat composition is made by mixing and milling the grinding resin and the pigments, in combination with the bismuth subsalicylate, in a stirred mill, until a preselected fineness has been reached, to form a storage stable pigment paste and then combining the pigment paste with a dispersion comprising the binder and crosslinking agent, wherein the storage stable pigment paste does not undergo sedimentation after storage for two months at 40° C.

9. A composition for a storage stable pigment paste used for making an electrocoat composition comprising:
   (A) a bismuth subsalicylate compound having an empirical formula of $C_7H_5O_4Bi$ that is water-insoluble and pulverulent, wherein the bismuth subsalicylate (C) has a bismuth content of from 56.5 to 60% by weight;
   (B) pigments selected from the group consisting of color pigments, effect pigments, electrically conductive pigments, magnetically shielding pigments, fluorescent pigments, extender pigments, anticorrosion pigments, organic pigments, inorganic pigments, and mixtures comprising at least one of the foregoing; and
   (C) a grinding resin;
   wherein the storage stable pigment paste is made mixing and milling the grindin resin and the pigments, in combination with the bismuth subsalicylate, in a stirred mill in circulation mode until a preselected fineness is reached;
   wherein the pigment paste is formulated for forming an electrocoat composition, which comprises from 0.2 to 5% by weight, based on solids in the composition, of the bismuth subsalicylate compound and is 5 to 35% by weight solids, when the pigment paste is combined with:
   (i) at least one binder comprising at least one group that is a potentially cationic ammonium group and/or cationic ammonium group, and one or more reactive functional groups which undergo thermal crosslinking reactions with a crosslinking agent (ii), and
   (ii) at least one crosslinking agent.

10. The composition of claim 9 wherein the storage stable pigment paste does not undergo sedimentation after storage for two months at 40° C.

11. The composition of claim 9 wherein the grinding resin is an epoxy-amine adduct.

* * * * *